United States Patent [19]

Maeda

[11] 4,401,362
[45] Aug. 30, 1983

[54] F—θ LENS SYSTEM
[75] Inventor: Haruo Maeda, Hino, Japan
[73] Assignee: Olympus Optical Co., Ltd., Tokyo, Japan
[21] Appl. No.: 282,948
[22] Filed: Jul. 13, 1981
[30] Foreign Application Priority Data
  Jul. 15, 1980 [JP] Japan .................. 55-96385
[51] Int. Cl.³ ................... G02B 9/14; G02B 27/17
[52] U.S. Cl. ........................ 350/6.8; 350/475
[58] Field of Search ................ 350/475, 6.8
[56] References Cited
  U.S. PATENT DOCUMENTS
  4,179,183 12/1979 Tatcoka et al. ............ 350/6.1
  4,258,981 3/1981 Goto ..................... 350/475
  4,269,478 5/1981 Maeda et al. ............. 350/6.8 X
  4,277,128 7/1981 Kawamura ................. 350/6.8

FOREIGN PATENT DOCUMENTS
  54-41149 4/1979 Japan ..................... 350/475
  54-150144 11/1979 Japan .................... 350/475

*Primary Examiner*—John K. Corbin
*Assistant Examiner*—Scott J. Sugarman
*Attorney, Agent, or Firm*—Cushman, Darby & Cushman

[57] ABSTRACT

An f—θ lens system comprising the first lens element which is a positive lens, the second lens element which is a negative lens and the third lens element which is a positive lens. This lens system can be formed as a small lens of a wide angle and has a focusing ability close to the diffraction limit.

6 Claims, 8 Drawing Figures

F−θ LENS SYSTEM

BACKGROUND OF THE INVENTION (a) Field of the Invention

The present invention relates to improvements in f−θ lens systems.

FIG. 1 of the accompanying drawings shows a known optical scanning device wherein a modulated light beam from a light source 1 is deflected by a rotary polygonal mirror 2 and is focused as a spot on a scanning surface 4 by a focusing lens 3. In such optical scanning device, the spot of the light beam is required to move at a constant velocity on the scanning surface. In order to meet this requirement it is necessary to utilize a lens system of a large negative distortion called an f−θ lens as the focusing lens 3.

(b) Description of the Prior Art

The lens systems disclosed in Japanese published unexamined patent applications Nos. 150144/79 and 41149/79 are known as f−θ lenses. The former of these lens systems consists of three or four lens elements and two convex lens elements are used in the rear group. These two convex lens elements are required to have large diameters and are therefore expensive. The latter of them consists of three lens elements but, as the entire length of the lens system is about 0.3 f (f represents a focal length of the lens system), its entirety is large. Further, the aperture ratio is F/95 and there is a defect that a small spot can not be obtained.

SUMMARY OF THE INVENTION

A primary object of the present invention is to provide an f−θ lens system which is small, is of a wide angle and has a focusing ability close to the diffraction limit.

The f−θ lens system according to the present invention is a lens system comprising the first lens element which is a positive lens, the second lens element which is a negative lens and the third lens element which is a positive lens as arranged in turn from the light entrance side, that is, the side on which a rotary polygonal mirror is located and satisfying the following respective conditions:

$$0.13 f \leq L \leq 0.19 f \quad (1)$$

$$0.9 \leq r_2/r_3 \leq 1.15 \quad (2)$$

$$-1.65 f \leq f_{12} \leq -0.3 f \quad (3)$$

where f represents a focal length of the entire system, L represents as entire length $(d_1+d_2+d_3+d_4+d_5)$ of the lens system, $f_{12}$ represents a composite focal length of the first lens element and second lens element and $r_2$ and $r_3$ represent respective radii of curvature of the surface on the light exit side of the first lens element and of the surface on the light entrance side of the second lens element.

The condition (1) above is to determine the entire length of the lens system. That is to say, if the entire length becomes so large as to exceed the upper limit of 0.19 f, the entire lens will become large and the image surface outside the axis will be corrected in excess. On the contrary, if the entire length becomes so small as to exceed the lower limit of 0.13 f, the distortion which is a characteristic of the f−θ lens will be corrected short.

The condition (2) above is to define the shape of an air lens between the first lens element and second lens element. If the above mentioned $r_2/r_3$ becomes so large as to exceed the upper limit of 1.15, the coma in the marginal part of the image field will deteriorate and the spot close to the diffraction limit will be no longer obtained. On the contrary, if the above mentioned $r_2/r_3$ becomes so small as to exceed the lower limit of 0.9, the image surface outside the axis will greatly approach the negative side and no flat image surface will be obtained.

The condition (3) above is to define a composite focal length of the first lens element and second lens element. If the composite focal length becomes so small as to exceed the upper limit of −0.3 f, the distortion will be corrected short and the coma flare in the marginal part of the image field will increase. On the contrary, if it becomes so large as to exceed the lower limit of −1.65, the astigmatism will become large.

DESCRIPTION OF THE PREFERRED EMBODIMENTS

Preferred embodiments of the f−θ lens system according to the present invention explained above are as shown in the following:

| Embodiment 1 | | | |
|---|---|---|---|
| f = 1, | θ = 29.1°, | | F/50 |
| $r_1$ = −0.2405 | | | |
| $d_1$ = 0.0322 | | $n_1$ = 1.75606 | $\nu_1$ = 26.52 |
| $r_2$ = −0.0844 | | | |
| $d_2$ = 0.0025 | | | |
| $r_3$ = −0.0823 | | | |
| $d_3$ = 0.0369 | | $n_2$ = 1.72309 | $\nu_2$ = 28.46 |
| $r_4$ = −0.8745 | | | |
| $d_4$ = 0.0199 | | | |
| $r_5$ = −50.7144 | | | |
| $d_5$ = 0.0622 | | $n_3$ = 1.72309 | $\nu_3$ = 28.46 |
| $r_6$ = −0.2993 | | | |
| L = 0.154f, | $r_2/r_3$ = 1.025, | | $f_{12}$ = −0.525f |
| Embodiment 2 | | | |
| f = 1, | θ = 25.5°, | | F/50 |
| $r_1$ = −0.1721 | | | |
| $d_1$ = 0.0333 | | $n_1$ = 1.72309 | $\nu_1$ = 28.46 |
| $r_2$ = −0.0878 | | | |
| $d_2$ = 0.0072 | | | |
| $r_3$ = −0.0868 | | | |
| $d_3$ = 0.0228 | | $n_2$ = 1.72309 | $\nu_2$ = 28.46 |
| $r_4$ = −0.2394 | | | |
| $d_4$ = 0.0404 | | | |
| $r_5$ = −12.2004 | | | |
| $d_5$ = 0.0469 | | $n_3$ = 1.72309 | $\nu_3$ = 28.46 |
| $r_6$ = −0.4712 | | | |
| L = 0.151f, | $r_2/r_3$ = 1.011, | | $f_{12}$ = −1.434f |
| Embodiment 3 | | | |
| f = 1, | θ = 25.5°, | | F/50 |
| $r_1$ = −0.1488 | | | |
| $d_1$ = 0.0292 | | $n_1$ = 1.72309 | $\nu_1$ = 28.46 |
| $r_2$ = −0.0934 | | | |
| $d_2$ = 0.0079 | | | |
| $r_3$ = −0.0928 | | | |
| $d_3$ = 0.0142 | | $n_2$ = 1.72309 | $\nu_2$ = 28.46 |
| $r_4$ = −0.2085 | | | |
| $d_4$ = 0.0475 | | | |
| $r_5$ = −1.7867 | | | |
| $d_5$ = 0.0469 | | $n_3$ = 1.72309 | $\nu_3$ = 28.46 |
| $r_6$ = −0.3582 | | | |
| L = 0.146f, | $r_2/r_3$ = 1.007, | | $f_{12}$ = −1.099f |

-continued

| Embodiment 4 | | | |
|---|---|---|---|
| f = 1, | θ = 25.5°, | F/50 | |
| r₁ = −0.1545 | | | |
| d₁ = 0.0314 | n₁ = 1.72309 | ν₁ = 28.46 | |
| r₂ = −0.0925 | | | |
| d₂ = 0.0075 | | | |
| r₃ = −0.0918 | | | |
| d₃ = 0.0169 | n₂ = 1.72309 | ν₂ = 28.46 | |
| r₄ = −0.2137 | | | |
| d₄ = 0.0543 | | | |
| r₅ = −2.9151 | | | |
| d₅ = 0.0415 | n₃ = 1.72309 | ν₃ = 28.46 | |
| r₆ = −0.4076 | | | |
| L = 0.152f, | r₂/r₃ = 1.007, | f₁₂ = −1.263f | |
| Embodiment 5 | | | |
| f = 1, | θ = 25.5°, | F/50 | |
| r₁ = −0.1592 | | | |
| d₁ = 0.0279 | n₁ = 1.72309 | ν₁ = 28.46 | |
| r₂ = −0.0905 | | | |
| d₂ = 0.0085 | | | |
| r₃ = −0.0895 | | | |
| d₃ = 0.0146 | n₂ = 1.72309 | ν₂ = 28.46 | |
| r₄ = −0.2235 | | | |
| d₄ = 0.0737 | | | |
| r₅ = −3.0525 | | | |
| d₅ = 0.0502 | n₃ = 1.72309 | ν₃ = 28.46 | |
| r₆ = −0.3954 | | | |
| L = 0.175f, | r₂/r₃ = 1.011, | f₁₂ = −1.14f | |

In the above mentioned respective embodiments, the reference symbols $r_1, r_2, \ldots, r_6$ represent radii of curvature of the respective lens elements, the symbols $d_1, d_2, \ldots, d_5$ represent thicknesses and airspaces of the respective lenses, the symbols $n_1$, $n_2$ and $n_3$ represent refractive indices for $\lambda = 632.8$ nm of the respective lens elements and the symbols $\nu_1$, $\nu_2$ and $\nu_3$ represent Abbe's numbers for the line d of the respective lens elements.

Figure 1:
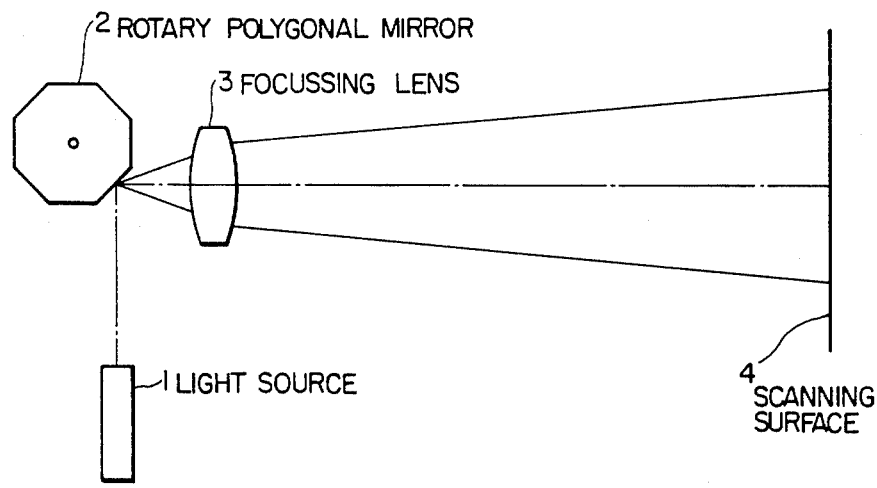
FIG. 1 is a schematic view showing an example of optical scanning device in which an f−θ lens system is used.
Figure 2:
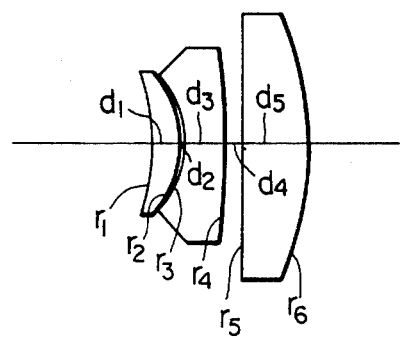
FIGS. 2 and 3 are sectional views of respective f−θ lens systems according to the present invention.
Figure 3:
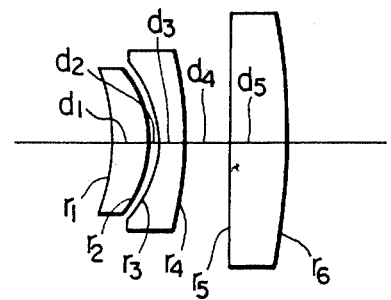
Figure 4:
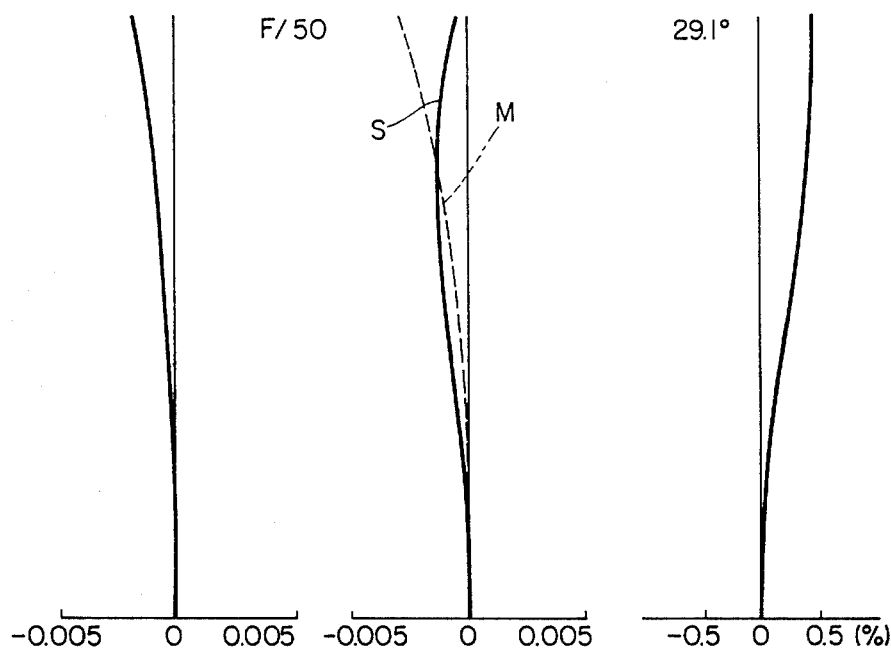
FIGS. 4 to 8 are graphs showing respective aberration curves of embodiments 1 to 5.
Figure 4:
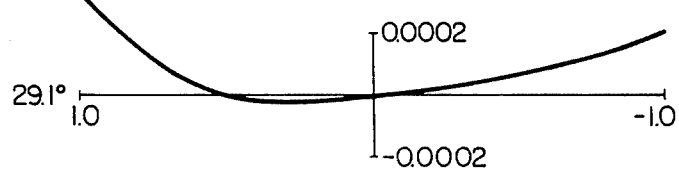
Figure 4:
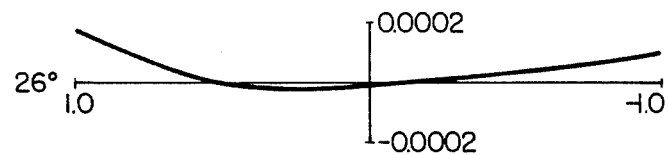
Figure 5:
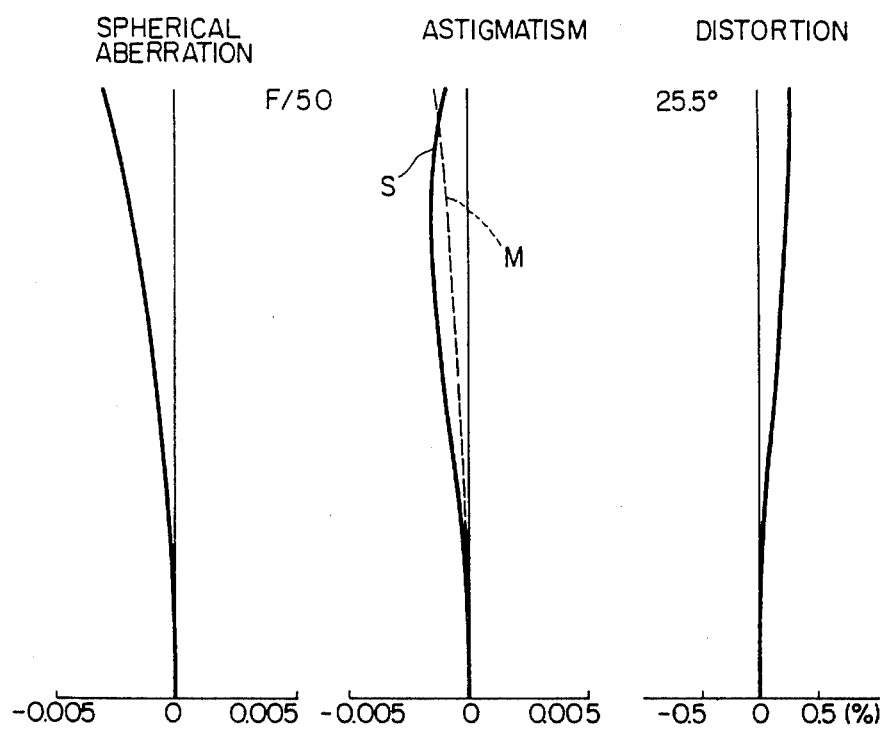
Figure 5:
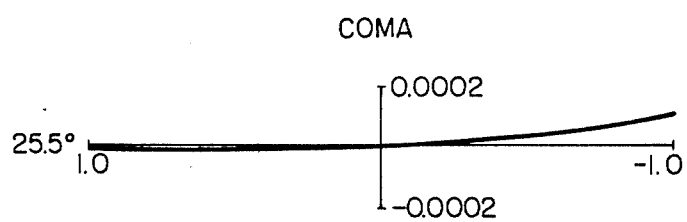
Figure 6:
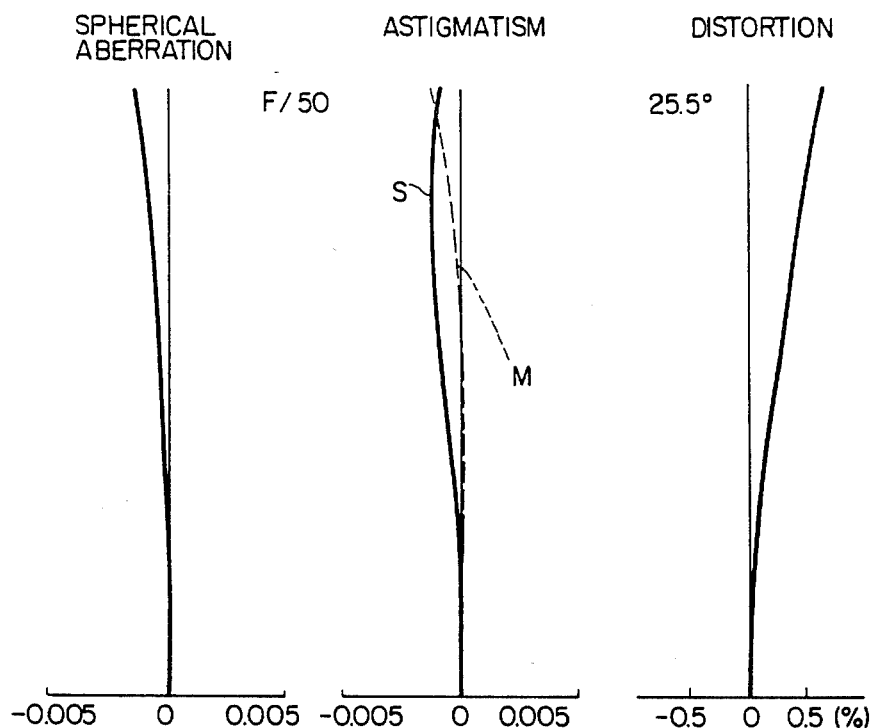
Figure 6:
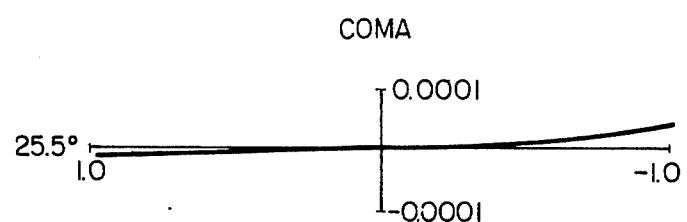
Figure 7:
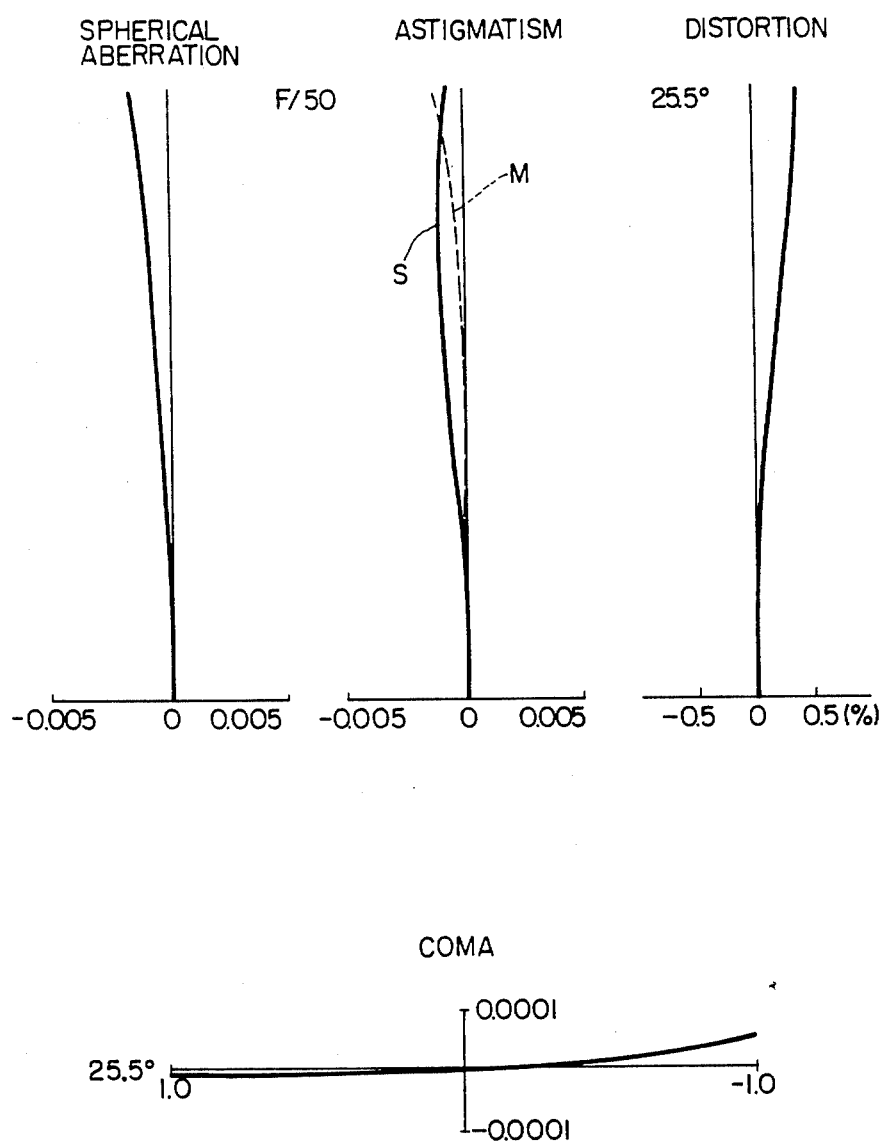
Figure 8:
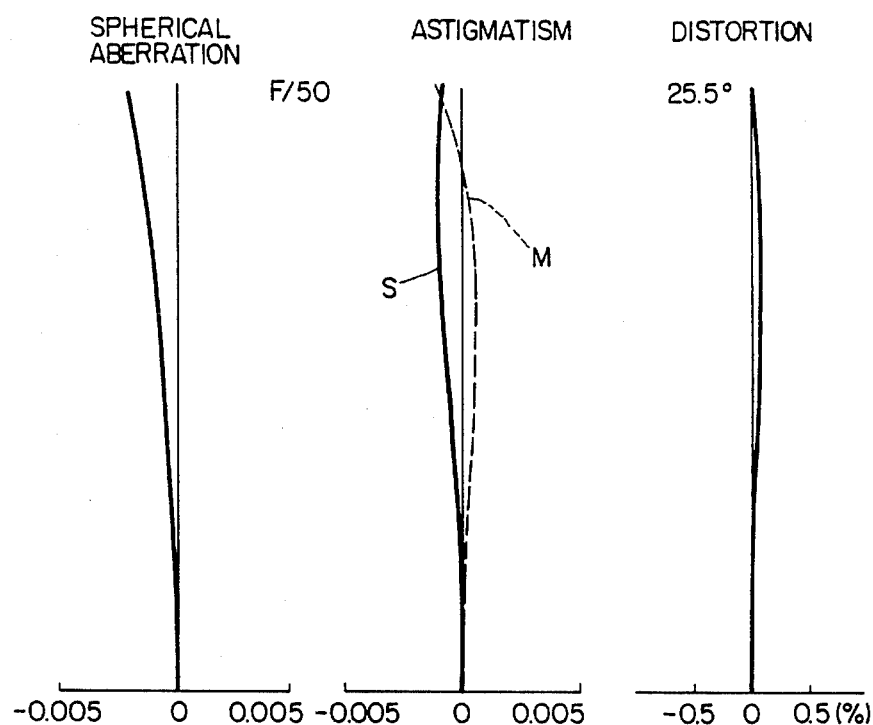
Figure 8:
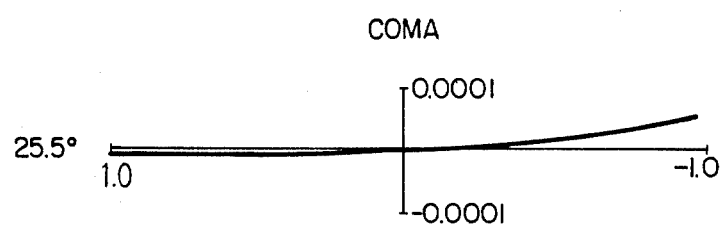

The embodiment 1 of the above mentioned embodiments is of the lens formation shown in FIG. 1. The embodiments 2 to 5 are of such lens formation as is shown in FIG. 2.

I claim:

1. An $f-\theta$ lens system consisting of the first lens element which is a positive lens, the second lens element which is a negative lens and the third lens element which is a positive lens and satisfying the following conditions:

$$0.13f \leq L \leq 0.19f \quad (1)$$

$$0.9 \leq r_2/r_3 \leq 1.15 \quad (2)$$

$$-1.65f \leq f_{12} \leq -0.3f \quad (3)$$

wherein the reference symbol f represents a focal length of the entire system, the symbol $f_{12}$ represents a composite focal length of the first lens element and second lens element, the symbol L represents an entire length of the lens system and the symbols $r_2$ and $r_3$ represent respective radii of curvature of the surface on the light exit side of the first lens element and of the surface on the light entrance side of the second lens element.

2. An $f-\theta$ lens system according to claim 1, in which said $f-\theta$ lens system has the following numerical data:

| f = 1, | θ = 29.1°, | F/50 | |
|---|---|---|---|
| r₁ = −0.2405 | | | |
| d₁ = 0.0322 | n₁ = 1.75606 | ν₁ = 26.52 | |
| r₂ = −0.0844 | | | |
| d₂ = 0.0025 | | | |
| r₃ = −0.0823 | | | |
| d₃ = 0.0369 | n₂ = 1.72309 | ν₂ = 28.46 | |
| r₄ = −0.8745 | | | |
| d₄ = 0.0199 | | | |
| r₅ = −50.7144 | | | |
| d₅ = 0.0622 | n₃ = 1.72309 | ν₃ = 28.46 | |
| r₆ = −0.2993 | | | |
| L = 0.154f, | r₂/r₃ = 1.025, | f₁₂ = −0.525f | | wherein the reference symbols $r_1, r_2, \ldots, r_6$ represent radii of curvature of the respective lens elements, the symbols, $d_1, d_2, \ldots, d_5$ represent thicknesses and airspaces of the respective lenses, the symbols $n_1$, $n_2$ and $n_3$ represent refractive indices for $\lambda = 632.8$ nm of the respective lens elements and the symbols $\nu_1$, $\nu_2$ and $\nu_3$ represent Abbe's numbers for the line d of the respective lens elements.

3. An $f-\theta$ lens system according to claim 1, in which said $f-\theta$ lens system has the following numerical data:

| f = 1, | θ = 25.5°, | F/50 | |
|---|---|---|---|
| r₁ = −0.1721 | | | |
| d₁ = 0.0333 | n₁ = 1.72309 | ν₁ = 28.46 | |
| r₂ = −0.0878 | | | |
| d₂ = 0.0072 | | | |
| r₃ = −0.0868 | | | |
| d₃ = 0.0228 | n₂ = 1.72309 | ν₂ = 28.46 | |
| r₄ = −0.2394 | | | |
| d₄ = 0.0404 | | | |
| r₅ = −12.2004 | | | |
| d₅ = 0.0469 | n₃ = 1.72309 | ν₃ = 28.46 | |
| r₆ = −0.4712 | | | |
| L = 0.151f, | r₂/r₃ = 1.011, | f₁₂ = −1.434f | | wherein the reference symbols $r_1, r_2, \ldots, r_6$ represent radii of curvature of the respective lens elements, the symbols $d_1, d_2, \ldots, d_5$ represent thicknesses and airspaces of the respective lenses, the symbols $n_1$, $n_2$ and $n_3$ represent refractive indices for $\lambda = 632.8$ nm of the respective lens elements and the symbols $\nu_1$, $\nu_2$ and $\nu_3$ represent Abbe's numbers for the line d of the respective lens elements.

4. An $f-\theta$ lens system according to claim 1, in which said $f-\theta$ lens system has the following numerical data:

| f = 1, | θ = 25.5°, | F/50 | |
|---|---|---|---|
| r₁ = −0.1488 | | | |
| d₁ = 0.0292 | n₁ = 1.72309 | ν₁ = 28.46 | |
| r₂ = −0.0934 | | | |
| d₂ = 0.0079 | | | |
| r₃ = −0.0928 | | | |
| d₃ = 0.0142 | n₂ = 1.72309 | ν₂ = 28.46 | |
| r₄ = −0.2085 | | | |
| d₄ = 0.0475 | | | |
| r₅ = −1.7867 | | | |
| d₅ = 0.0469 | n₃ = 1.72309 | ν₃ = 28.46 | |
| r₆ = −0.3582 | | | |
| L = 0.146f, | r₂/r₃ = 1.007, | f₁₂ = −1.099f | | wherein the reference symbols $r_1, r_2, \ldots, r_6$ represent radii of curvature of the respective lens elements, the symbols $d_1, d_2, \ldots, d_5$ represent thicknesses and airspaces of the respective lenses, the symbols $n_1$, $n_2$ and $n_3$ represent refractive indices for $\lambda = 632.8$ nm of the respective lens elements and the symbols $\nu_1$, $\nu_2$ and $\nu_3$ represent Abbe's numbers for the line d of the respective lens elements.

5. An f−θ lens system according to claim 1, in which said f−θ lens system has the following numerical data:

| f = 1, | θ = 25.5°, | F/50 |
|---|---|---|
| $r_1 = -0.1545$ | | |
| $d_1 = 0.0314$ | $n_1 = 1.72309$ | $\nu_1 = 28.46$ |
| $r_2 = -0.0925$ | | |
| $d_2 = 0.0075$ | | |
| $r_3 = -0.0918$ | | |
| $d_3 = 0.0169$ | $n_2 = 1.72309$ | $\nu_2 = 28.46$ |
| $r_4 = -0.2137$ | | |
| $d_4 = 0.0543$ | | |
| $r_5 = -2.9151$ | | |
| $d_5 = 0.0415$ | $n_3 = 1.72309$ | $\nu_3 = 28.46$ |
| $r_6 = -0.4076$ | | |
| $L = 0.152f$, | $r_2/r_3 = 1.007$, | $f_{12} = -1.263f$ | wherein the reference symbols $r_1, r_2, \ldots, r_6$ represent radii of curvature of the respective lens elements, the symbols $d_1, d_2, \ldots, d_5$ represent thicknesses and airspaces of the respective lenses, the symbols $n_1$, $n_2$ and $n_3$ represent refractive indices for λ=632.8 nm of the respective lens elements and the symbols $\nu_1$, $\nu_2$ and $\nu_3$ represent Abbe's numbers for the line d of the respective lens elements.

6. An f−θ lens system according to claim 1, in which said f−θ lens system has the following numerical data:

| f = 1, | θ = 25.5°, | F/50 |
|---|---|---|
| $r_1 = -0.1592$ | | |
| $d_1 = 0.0279$ | $n_1 = 1.72309$ | $\nu_1 = 28.46$ |
| $r_2 = -0.0905$ | | |
| $d_2 = 0.0085$ | | |
| $r_3 = -0.0895$ | | |
| $d_3 = 0.0146$ | $n_2 = 1.72309$ | $\nu_2 = 28.46$ |
| $r_4 = -0.2235$ | | |
| $d_4 = 0.0737$ | | |
| $r_5 = -3.0525$ | | |
| $d_5 = 0.0502$ | $n_3 = 1.72309$ | $\nu_3 = 28.46$ |
| $r_6 = -0.3954$ | | |
| $L = 0.175f$, | $r_2/r_3 = 1.011$, | $f_{12} = -1.14f$ | wherein the reference symbols $r_1, r_2, \ldots, r_6$ represent radii of curvature of the respective lens elements, the symbols $d_1, d_2, \ldots, d_5$ represent thicknesses and airspaces of the respective lenses, the symbols $n_1$, $n_2$ and $n_3$ represent refractive indices for λ=632.8 nm of the respective lens elements and the symbols $\nu_1$, $\nu_2$ and $\nu_3$ represent Abbe's numbers for the line d of the respective lens elements.

* * * * *